United States Patent
Sakai

(10) Patent No.: US 7,336,663 B2
(45) Date of Patent: Feb. 26, 2008

(54) RESOURCE RESERVATION PROTOCOL SUBSTITUTE REPLY ROUTER, RESOURCE RESERVATION PROTOCOL SUBSTITUTE REPLY SYSTEM AND RESOURCE RESERVATION PROTOCOL SUBSTITUTE REPLY METHOD USED IN THE SAME

(75) Inventor: Masanao Sakai, Tokyo (JP)

(73) Assignee: Nec Corporation, Tokyo (JP)

( * ) Notice: Subject to any disclaimer, the term of this patent is extended or adjusted under 35 U.S.C. 154(b) by 903 days.

(21) Appl. No.: 10/657,254

(22) Filed: Sep. 9, 2003

(65) Prior Publication Data

US 2004/0081098 A1    Apr. 29, 2004

(30) Foreign Application Priority Data

Sep. 11, 2002    (JP)    ............... 2002-264915

(51) Int. Cl.
   *H04L 12/28*    (2006.01)
(52) U.S. Cl. ................ 370/395.3; 370/389
(58) Field of Classification Search ........... 370/402, 370/351, 389, 392, 395.21, 395.41, 401, 370/428, 358, 386, 391, 393, 395.3, 395.5
See application file for complete search history.

(56) References Cited

U.S. PATENT DOCUMENTS 7,076,540 B2 *    7/2006    Kurose et al. ............... 709/223

FOREIGN PATENT DOCUMENTS

| EP | 1 294 138 A2 | 3/2003 |
|----|--------------|--------|
| JP | 2001-352347  | 12/2001 |

* cited by examiner

*Primary Examiner*—Brenda Pham
(74) *Attorney, Agent, or Firm*—Foley & Lardner LLP

(57) ABSTRACT

A resource reservation protocol substitute reply router is provided for enabling execution of RSVP procedure as substitute by automatically detecting that a reception host does not support RSVP. A Path message storage portion stores a Path message handled by an RSVP control portion. An ICMP detecting portion monitors data packet input to a routing portion. When "message of Destination Unreachable" is found in the packet, an IP header information contained in the ICMP message and a stored value of the Path message storage portion are compared. If matched one is present, the ICMP message is disposed, and in place, it is requested to the substitute RSVP control portion to execute the procedure of RSVP on behalf of the reception host. The substitute RSVP control portion executes the procedure of RSVP on behalf of the original reception host.

15 Claims, 15 Drawing Sheets

FIG. 5A

IP HEADER FORMAT

| VERSION | IHL | TYPE OF SERVICE | TOTAL LENGTH | |
|---|---|---|---|---|
| IDENTIFICATION | | | FLAGS | FRAGMENT OFFSET |
| TIME TO LIVE | | PROTOCOL | HEADER CHECK SUM | |
| SENDER ADDRESS | | | | |
| RECIPIENT ADDRESS | | | | |

FIG. 5B

RSVP PROTOCOL FORMAT

| VERSION | FLAGS | MESSAGE TYPE | RSVP CHECK SUM |
|---|---|---|---|
| SEND_TTL | | (RESERVE) | RSVP LENGTH |
| RSVP PAYLOAD | | | |

FIG. 6

| VERSION | IHL | TYPE OF SERVICE | TOTAL LENGTH | |
|---|---|---|---|---|
| (IDENTIFICATION) 1 2 3 4 5 | | | FLAGS | FRAGMENT OFFSET |
| TIME TO LIVE | | (PROTOCOL) 4 6 | HEADER CHECK SUM | |
| (SENDER ADDRESS) RECEPTION HOST 3 | | | | |
| (RECIPIENT ADDRESS) TRANSMISSION HOST 21 | | | | |
| VERSION | FLAGS | MESSAGE TYPE | RSVP CHECK SUM | |
| SEND_TTL | | (RESERVE) | RSVP LENGTH | |
| RSVP PAYLOAD | | | | |

FIG. 7

| PATH MESSAGE | SENDER ADDRESS | RECIPIENT ADDRESS | IDENTIFICATION |
|---|---|---|---|
| PATH MESSAGE | TRANSMISSION HOST 3 | RECEPTION HOST 21 | 1 2 3 4 5 |
| | | | |
| | | | |

FIG. 8

| TYPE (=3) | CODE (=2) | CHECK SUM |
|---|---|---|
| NOT USED ||| 
| CONTENT OF ORIGINAL IP HEADER |||
| 8 BYTE ORIGINAL DATAGRAM |||

FIG. 9

| (TYPE) 3 | (CODE) 2 | CHECK SUM | | |
|---|---|---|---|---|
| NOT USED | | | | |
| VERSION | IHL | TYPE OF SERVICE | TOTAL LENGTH | |
| (IDENTIFICATION) 1 2 3 4 5 | | | FLAGS | FRAGMENT OFFSET |
| TIME TO LIVE | | (PROTOCOL) 4 6 | HEADER CHECK SUM | |
| (SENDER ADDRESS) RECEPTION HOST 3 | | | | |
| (RECIPIENT ADDRESS) TRANSMISSION HOST 21 | | | | |
| VERSION | FLAGS | MESSAGE TYPE | RSVP CHECK SUM | |
| SEND_TTL | | (RESERVE) | RSVP LENGTH | | ns
RESOURCE RESERVATION PROTOCOL SUBSTITUTE REPLY ROUTER, RESOURCE RESERVATION PROTOCOL SUBSTITUTE REPLY SYSTEM AND RESOURCE RESERVATION PROTOCOL SUBSTITUTE REPLY METHOD USED IN THE SAME

CROSS REFERENCE TO THE RELATED APPLICATION

The present application has been filed with claiming priority based on Japanese Patent Application No. 2002-264915, filed on Sep. 11, 2002. Disclosure of the above-identified Japanese Patent Application is herein incorporated by reference.

BACKGROUND OF THE INVENTION

1. Field of the Invention

The present invention relates to a resource reservation protocol (RSVP) substitute reply router, a RSVP substitute reply system and a RSVP substitute reply method to be used in the same. More particularly, the invention relates to a network of RSVP used for quality of service (QoS) guarantee.

2. Description of the Related Art

In the recent years, speeding up of an access line called as last one mile has been progressed quickly. Even in consumers, it has been becoming to easily use high speed access line, such as CATV (CAble TeleVision), ADSL (Asymmetric Digital Subscriber Line), FTTH (Fiber To The Home) or the like. Since high speed access lines become available for large number of users, service providers providing image broadcasting service which has been impossible in the conventional low speed line, are coming into services.

In such image broadcasting services, currently, service is provided in best effort manner relying on a high speed backbone of Internet. However, in order to put high quality image broadcasting into practice, QoS (Quality of Server) guarantee (acquiring of band, guarantee of delay) in broadcasting path becomes necessary. On the other hand, for providing image broadcasting to the users as business, QoS guarantee is inherent upon image broadcasting.

Currently, as a protocol to be used for QoS guarantee in Internet, RSVP has been standardized. This is a protocol for sequentially reserving resource of routers through which RSVP messages pass, by exchanging of RSVP messages between both hosts transmitting and receiving data in RSVP.

A procedure of forgoing RSVP is shown in FIG. 15. In RSVP procedure, an RSVP recognition source host 34 transmits a Path message indicative of traffic characteristics to an RSVP recognition recipient host 31, as shown in FIG. 15. The Path message reaches the RSVP recognition recipient host 31 via switches 33 and 32 (RSVP compatible routers) on the path and a backbone network (RSVP network) 200.

When the Path message is received, the RSVP recognition recipient host 31 transmits a Resv (reserve) message indicating a desired QoS to the switch 32 immediately before on the foregoing path. The switch 32 reserves a resource in the switch 32 and transfers the Resv message to the switch 33 of the preceding stage on the path for guarantee QoS indicated in the Resv message. Even in the switch 33, a resource in the switch 33 is reserved and transfers the Resv message to the RSVP recognition source host 34 in order to guarantee QoS indicated in the Resv message. At a timing where the Resv message arrives to the RSVP recognition source host 34, all of the resources on the path are reserved in order to guarantee QoS indicated in the Resv message.

For the RSVP recognition recipient host 31, data of high quality image or the like is transmitted using the resources reserved through the foregoing process. However, once transmission of these data is completed, reservation of resource is released in the switches 33 and 32 by feeding a Path Tear message to the RSVP recognition recipient host 31 via the switches 33 and 32 on the path and the backbone network 200. It should be noted that a Path message is fed with a preliminarily set predetermined interval from the RSVP recognition source host 34. In response to the Path message, the Resv message is returned with a predetermined interval from the RSVP recognition recipient host 31. Accordingly, when the Path Tear message is lost in the midway, judgment is made that reservation is released to release the reserved resource when the Path message does not arrive even after the predetermined interval.

However, RSVP is a protocol having large process load. In a router on the Internet, RSVP is generally not supported. On the other hand, since RSVP is not supported on Internet, RSVP is not installed in many of the existing communication hosts. It should be appreciated that, toward the future, in order to provide a service for the application requiring QoS guarantee represented by foregoing image broadcasting, it is expected that RSVP router may be arranged in particular range [inside of one ISP (Internet Service Provider)]. At this time, a problem is arisen in the communication host not adapted to RSVP.

Even if the RSVP router is arranged on the network, effect of RSVP cannot be obtained unless RSVP is installed in the communication host transmitting and receiving data. Even in the communication host not adapted to RSVP, it has been desired a method to obtain the effect of QoS guarantee of the RSVP network. Even in the communication host not adapted to RSVP, as an example of the system where to obtain QoS guarantee effect of RSVP network, there is a system of service of RSVP proxy service (for example, see Japanese Unexamined Patent Publication No. 2001-352347 (pages 4 to 5, FIG. 1).

The RSVP proxy service is constructed with RSVP none recognition recipient host 35, switches 32 and 33, the RSVP recognition source host 34 and a backbone network (RSVP network) 200, as shown in FIG. 16. In the RSVP proxy service construction set forth above, the RSVP recognition source host 34 transmits the Path message of RSVP to the RSVP none recognition recipient host 35 in order to certainly obtain QoS of the transmission path of data packet.

The Path message transmitted from the RSVP recognizing source host 34 is transferred to the switch 33, at first, and is further transferred to the switch 32 via the backbone network (RSVP network) 200. At this time, when the Path message for particular destination is received, it is set to make RSVP reception side host proxy function in effect in the switch 32.

The switch 32 receiving the Path message checks a destination of the Path message to make judgment whether RSVP reception side host proxy function of the switch 32 is to be operated or not. When judgment is made that the RSVP reception side host proxy function is to be in effect, the switch 32 does not transfer the Path message to the RSVP none recognition recipient host 35 and instead the switch 32 transmits the Resv message toward the RSVP recognition source host 34 side to reserve the resource of the path up to the RSVP recognition source host 34 to guarantee QoS of the data packet transmitted from the RSVP recognition source host 34.

However, in the network of the conventional RSVP, since destination address is used as a condition for operating the RSVP reception side host proxy function, it becomes necessary to preliminarily register objective address to the switch 32.

Therefore, in the conventional network of RSVP, when the communication hosts not compatible with RSVP and communication hosts compatible with RSVP are present in the data reception side network in admixing manner, destination addresses to be registered in the switch 32 is increased to make management complicate. Particularly, when addresses of communication hosts are varied for rearrangement or other reason, addresses registered in the switch 32 has to be varied.

SUMMARY OF THE INVENTION

The present invention has been worked out in view of the problem set forth above. It is therefore an object of the present invention to provide an RSVP substitute reply router, an RSVP substitute reply system and an RSVP substitute reply method to be used in the same which can automatically detect that a reception host is not compatible with RSVP and execute RSVP procedure as substitute.

According to the first aspect of the present invention, a RSVP substitute reply router transferring a verification message transmitted from a transmission host to the reception host for acquiring guarantee of service quality of a transmission route upon transmitting data packet from the transmission hot to a reception host, comprises:

judgment means for monitoring a response message from the reception host for the verification message and making judgment whether the reception host is an equipment adapted to the RSVP or not; and substitute RSVP control means for executing a procedure of RSVP on behalf of the reception host which is judged as not being adapted to RSVP and making reservation of resource on the route to the transmission host.

According to the second aspect of the present invention, a RSVP substitute reply system transferring a verification message transmitted from a transmission host to the reception host for acquiring guarantee of service quality of a transmission route upon transmitting data packet from the transmission hot to a reception host by a RSVP substitute reply router arranged between the transmission host and the reception host, wherein the RSVP substitute reply router comprises:

judgment means for monitoring a response message from the reception host for the verification message and making judgment whether the reception host is an equipment adapted to the RSVP or not; and substitute RSVP control means for executing a procedure of RSVP on behalf of the reception host which is judged as not being adapted to RSVP and making reservation of resource on the route to the transmission host.

According to the third aspect of the present invention, a RSVP substitute reply method transferring a verification message transmitted from a transmission host to the reception host for acquiring guarantee of service quality of a transmission route upon transmitting data packet from the transmission hot to a reception host by a RSVP substitute reply router arranged between the transmission host and the reception host, wherein the RSVP substitute reply router monitoring a response message from the reception host for the verification message executing a procedure of RSVP on behalf of the reception host which is judged as not supporting RSVP for making reservation of resource on the route to the transmission host.

Namely, the RSVP substitute reply system according to the present invention can automatically detect a communication host which does not support RSVP and make reservation of resource on the route on behalf of the host.

More particularly, in the RSVP substitute reply system according to the present invention, the RSVP substitute reply router comprises the RSVP control portion which executes an above-mentioned general procedure of RSVP, the substitute RSVP control portion which executes a procedure of RSVP on behalf of the reception host, and ICMP (Internet Control Message Protocol) detecting portion which detects the Destination Unreachable message of ICMP and judges whether the detected message is the ICMP message for the transmitted Path message or not.

When the RSVP transmission host transmits data packet to the none RSVP reception host (reception host not supporting RSVP), the RSVP transmission host transmits the Path message of RSVP to the none RSVP reception host. The Path message reaches the RSVP substitute reply router via a RSVP network and reach the none RSVP reception host via the none RSVP router after implementing process of typical RSVP by the RSVP control portion.

Since the none RSVP reception host does not support RSVP, it transmits the RSVP transmission host as the sender of the Path message the message of "Destination Unreachable" of ICMP for the received Path message. Upon passing through the RSVP substitute reply router, the sent MP message is captured by the ICMP detecting portion and the ICMP detecting portion makes judgment whether the sent ICMP message is the ICMP message for the Path message transmitted by the RSVP substitute reply router or not.

If the sent ICMP massage is the ICMP message for the Path message, the ICMP detecting portion judges that the none RSVP reception host does not support RSVP, and commands substitute execution of RSVP procedure to the substitute RSVP control portion. The substitute RSVP control portion generates Resv message for the Path message on behalf of the reception host to transmit to the next hop router on the route to the RSVP transmission host.

The Resv message reaches the RSVP transmission host with making reservation of resource on the route of the RSVP network. At this timing, since the reservation of resource on the route up to the RSVP transmission host from the RSVP the RSVP substitute reply router is established, the RSVP transmission host can transmit data packet to the none RSVP reception host.

As set forth above, in the RSVP substitute reply system according to the present invention, presence of the none RSVP reception host is automatically detected without expressly setting the address of the none RSVP reception host on the RSVP substitute reply router to enable reservation of resource on the route by executing RSVP procedure on behalf of the none RSVP reception host.

Namely, in the RSVP substitute reply system according to the present invention, by detecting "message of Destination Unreacheable" of ICMP transmitted from the communication host by the RSVP substitute reply router, whether the communication host supports RSVP or not can be automatically detected. Therefore, when the communication host not supporting RSVP and the communication host supporting RSVP are present in the data reception side network in admixing manner, even not registering the address of each individual communication host in the RSVP substitute reply router, only for communication host not supporting RSVP, RSVP procedure can be executed.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 5A is an illustration showing a format of an IP header;

FIG. 5B is an illustration showing a format of an RSVP protocol;

FIG. 6 is an illustration showing an example of construction of a Path message which is transmitted from the RSVP transmission host to the none RSVP reception host;

FIG. 7 is an illustration showing an example of construction after registering the Path message in a Path message storage portion of FIG. 2;

FIG. 8 is an illustration showing a format of a "message of Protocol Unreachable" of a "message of Destination Unreachable" of ICMP;

FIG. 9 is an illustration showing an example of structure of the "message of Destination Unreachable" of ICMP transmitted from the none RSVP reception host of FIG. 1;

DESCRIPTION OF THE PREFERRED EMBODIMENT

The present invention will be discussed hereinafter in detail in terms of the preferred embodiment of an RSVP substitute reply system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
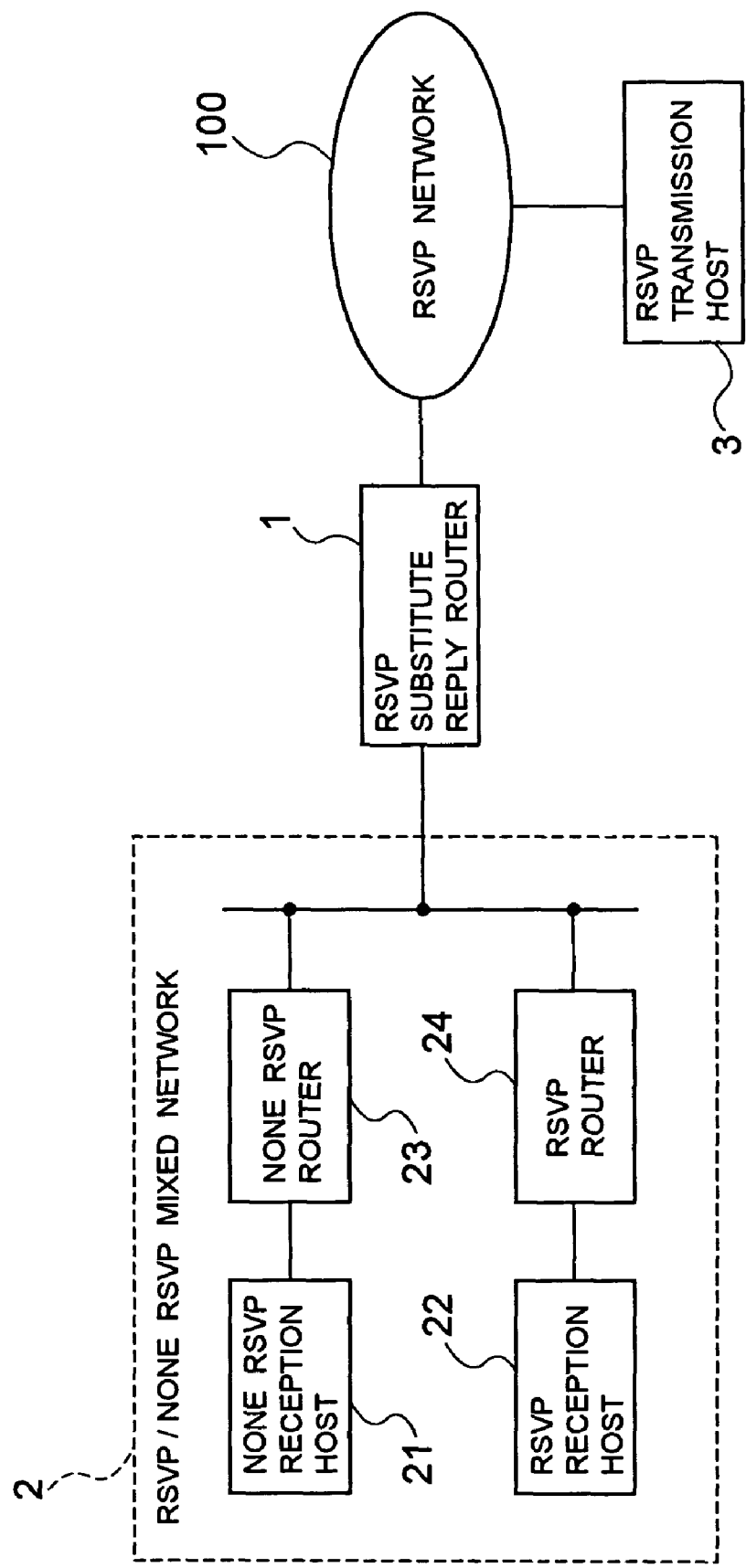
FIG. 1 is a block diagram showing a construction of one embodiment of an RSVP substitute reply system according to the present invention.

FIG. 1 is a block diagram showing a construction of one embodiment of an RSVP (ReSource reserVation Protocol) substitute reply system according to the present invention. In FIG. 1, one embodiment of the RSVP substitute reply system according to the present invention is constructed with a RSVP substitute reply router 1, an RSVP/none RSVP mixed network 2, an RSVP transmission host 3 and an RSVP network 100.

The RSVP substitute reply router 1 is a router unit and is connected to an RSVP network 100, in which an RSVP can be used and to the RSVP/none RSVP mixed network 2. The RSVP transmission host 3 is a personal computer, a server or the like adapted to RSVP, and is connected to the RSVP network 100.

The RSVP/none RSVP mixed network 2 is constructed with a none RSVP reception host 21, such as personal computer or the line not adapted to RSVP, a none RSVP router 23 as a router unit not adapted to RSVP, the RSVP reception host 22, such as personal computer or the like adapted to RSVP, and an RSVP router 24 as a router unit adapted to RSVP.

The none RSVP reception host 21 is connected to the none RSVP router 23. The RSVP reception host 22 is connected to the RSVP router 24. On the other hand, the none RSVP router 23, the RSVP router 24, the RSVP substitute reply router 1 are respectively connected with each other via a common physical link.

Figure 2:
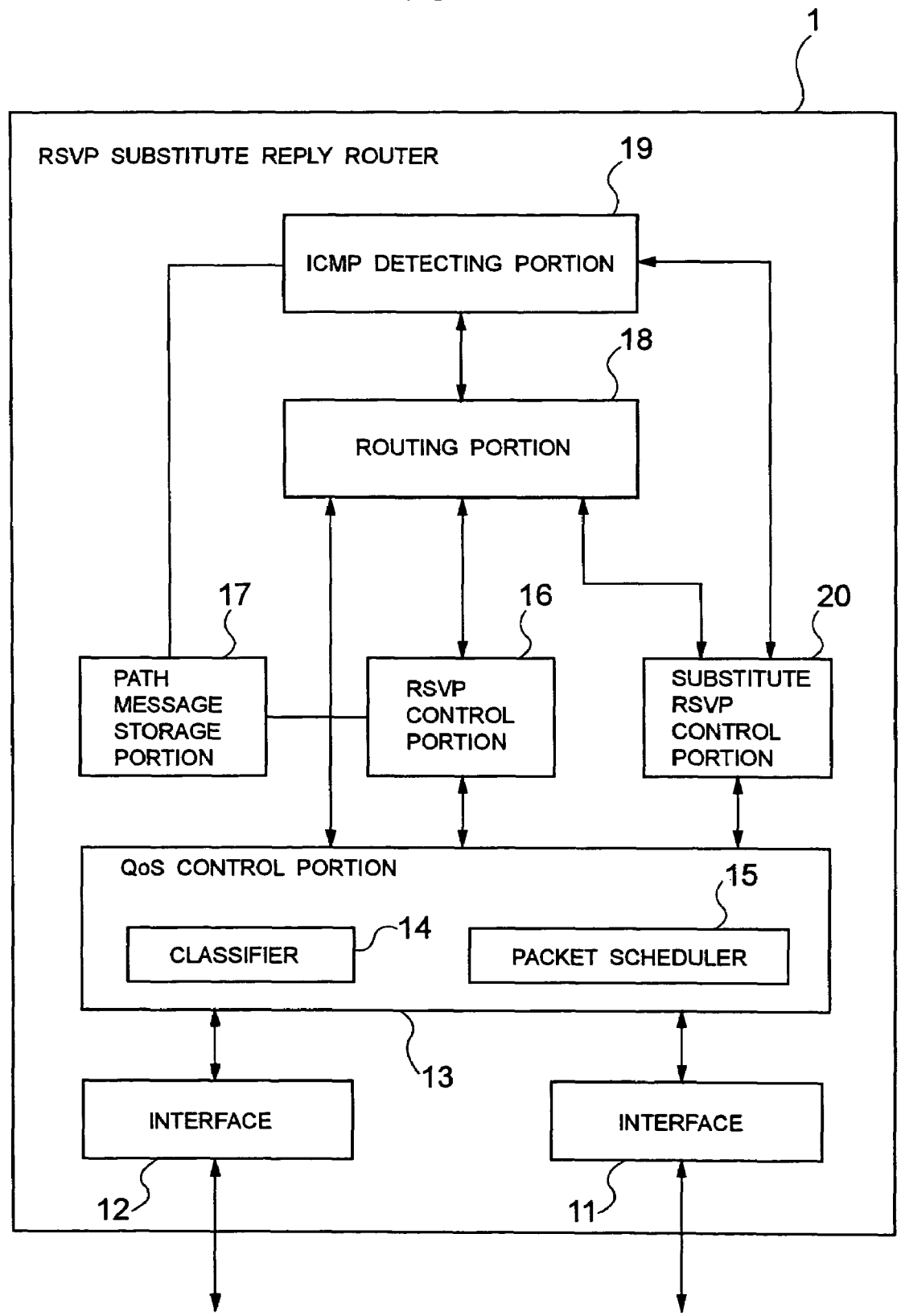
FIG. 2 is a block diagram showing a construction of an RSVP substitute reply router of FIG. 1.

FIG. 2 is a block diagram showing a construction of the RSVP substitute reply router 1 of FIG. 1. The RSVP substitute reply router 1 is constructed with an interface portions 11 and 12, QoS (Quality of Service) control portion 13, an RSVP control portion 16, a Path message storage portion 17, a routing portion 18, an ICMP (Internet Control Message Protocol) detecting portion 19 and a substitute RSVP control portion 20.

The interface portion 11 performs transmission and reception of data packet and RSVP messages with the RSVP network 100. The interface portion 12 performs transmission and reception of data packet, the RSVP messages, and ICMP messages with the RSVP/none RSVP mixed network 2.

The QoS control portion 13 is constructed with a classifier 14 classifying data packets to be object for QoS and a packet scheduler 15 controlling order of transmission of data packets so as to realize designated QoS. The QoS control portion 13 applies designated QoS for data packets transmitted and received via the interface portion 11 and the interface portion 12.

The RSVP control portion 16 executes normal RSVP procedure. The Path message storage portion 17 stores the content of the received Path message set by the RSVP control portion 16. The routing portion 18 determines a transfer path of the received data packet.

The ICMP detecting portion 19 captures ICMP message and makes judgment whether the message is the ICMP message for the Path message transferred by the RSVP control portion 16 or not. The substitute RSVP control portion 20 generates Resv message for the Path message according to instruction of the ICMP detecting portion 19 as substitute of the reception host.

The RSVP substitute reply router 1 is different from the conventional RSVP router as including the ICMP detecting portion 19. The ICMP detecting portion 19 operates with analyzing of the content of the ICMP message. Typical RSVP router only transfers the ICMP message to the final recipient and does not perform analysis of the content.

The foregoing components respectively operate as follow. At first, the interface portion 11 transfers data packet or the RSVP message received from the RSVP network 100 to the QoS control portion 13. On the other hand, the interface portion 11 transmits the data packet or the RSVP message transferred from the QoS control portion 13 to the RSVP network 100.

The interface portion 12 transfers the data packet or RSVP message received from the RSVP/none RSVP mixed network 2 to the QoS control portion 13. On the other hand, the interface portion 12 transmits the data packet or the RSVP message transferred from the QoS control portion 13 to the RSVP/none RSVP mixed network 2.

The QoS control portion 13 transfers the data packet or the RSVP message received from the interface portion 11 and the interface portion 12 to the routing portion 18. On the other hand, the QoS control portion 13 performs QoS control as required for the data packet or the RSVP message transferred to respective interface portions 11 and 12 from the routing portion 18 and transfers to respective interface portions 11 and 12. Furthermore, the QoS control portion 13 receives command for QoS control from the RSVP control portion 16 and the substitute RSVP control portion 20 to modify content of QoS control to be applied.

The classifier 14 is an element forming the QoS control portion 13 and classifies data packet or the RSVP message input to the QoS control portion 13 into QoS classes. A method for classifying into QoS classes is commanded from the RSVP control portion 16 and the substitute RSVP control portion 20.

The packet scheduler 15 is also component forming the QoS control portion 13 and manages order of transmission of the packet so that data packet classified into the QoS classes by the classifier 14 or the RSVP message are output from the QoS control portion 13 according to designated QoS. Applicable QoS is designated from the RSVP control portion 16 and the substitute RSVP control portion 20.

The RSVP control portion 16 performs transmission and reception of the RSVP message via the routing portion 18 and executes the foregoing conventional RSVP procedure, namely, typical RSVP procedure. When the Path message is received, the RSVP control portion 16 stores the content of the received Path message in the Path message storage portion 17 and transfers the Path message to the reception host as originally intended recipient. It should be noted that the RSVP control portion 16 also stores an Identification field, a sender address field, a recipient address field of an IP (Internet Protocol) header used for delivery of the Path message in addition to the content of the Path message when Path message is stored in the Path message storage portion 17.

On the other hand, when the Resv message is received, the RSVP control portion 16 performs reservation of resource for realizing QoS indicated by the Resv message. Namely, the RSVP control portion 16 commands classification into QoS classes and QoS to be applied to the QoS control portion 13. When commanding to the QoS control portion 13 is completed, the RSVP control portion 16 transmits Resv message a next hop router for reserving resource in the next hop router.

The Path message storage portion 17 stores the Path message handled by the RSVP control portion 16. The Path message storage portion 17 also stores values of the Identification field, the sender address field, the recipient address field of an IP header used for delivery of the Path message in addition to the content of the Path message when Path message is delivered.

The Identification field of the IP header is a value to be used for identifying divided respective packets when the IP packet is divided in the midway of the route, and is set by host transmitting the IP packet. The transmission host of the IP packet is set the value of Identification so that the same value should not be set for different packet upon transmitting to the same recipient. Therefore, IP packet can be uniquely identified using the sender address field, the recipient address field and the values of the Identification field of an IP packet.

By this, upon receipt of "message of Destination Unreachable" of ICMP which will be discussed later, judgment can be made for the corresponding Path message for the ICMP message by comparing IP header information contained in the ICMP message and the value stored in the Path message storage portion 17.

The routing portion 18 receives the data packet, the RSVP message or the like and delivers them to appropriate recipient (interface portion 11 or interface portion 12, the RSVP control portion 16, ICMP detecting portion 19 and so forth) according to the recipient address or recipient port.

The ICMP detecting portion 19 monitors data packet input to the routing portion 18. When "message of Destination Unreachable" of the ICMP message is found in the input packet, the ICMP detecting portion 19 compares with the IP header information contained in the ICMP message and the values of the Identification, the sender address and the recipient address stored in the Path message storage portion 17 for seeking matched one.

If matched one is not found, the ICMP detecting portion 19 makes judgment as being not relevant to return the process of the ICMP message to the routing portion 18 to permit the routing portion 18 to process the ICMP message as is. On the other hand, if matched one is found by the ICMP detecting portion 19 which means that "message of Destination Unreachable" of ICMP is returned for the Path message transmitted by the RSVP control portion 16, it can be appreciated that the reception host is not adapted to RSVP.

In this case, the ICMP detecting portion 19 disposes the ICMP message and notifies the Path message information to the substitute RSVP control portion 20 as substitute for requesting to the substitute RSVP control portion 20 to execute procedure of RSVP on behalf of the reception host.

The substitute RSVP control portion 20 is responsive to the command from the ICMP detecting portion 19 to execute procedure of RSVP on behalf of the original reception host for the designated Path message, to transmit Resv message to the next hop router on the route to the RSVP transmission host 3. At the same time, the substitute RSVP control portion 20 notifies applicable QoS for communication to the QoS control portion 13 and acquires the resource in the RSVP substitute reply router 1.

Operation of one embodiment of the RSVP substitute reply system according to the present invention is described with reference to FIG. 1. At first, the RSVP transmission host 3 transmits Path message of RSVP to the none RSVP reception host 21 in order to obtain guarantee of QoS in the transmission route upon transmission of data packet to the none RSVP reception host 21. Path message of the RSVP transmission host 3 arrives to the RSVP substitute reply router 1 via the RSVP network 100. The operation heretofore is the same as standard RSVP.

When Path message is received, the RSVP substitute reply router 1 transfers the message to the none RSVP router 23. The none RSVP router 23 further transfers the Path message to the none RSVP reception host 21 as final recipient. Since the none RSVP reception host 21 is not adapted to RSVP, Path message of RSVP cannot be received.

In IP when IP packet of not compatible protocol is received, it is determined to transmit "message of Protocol Unreachable" of "message of Destination Unreachable" of ICMP to the sender of the original message. Therefore, the none RSVP reception host 21 transmits the "message of Destination Unreachable" of ICMP to the RSVP transmission host 3.

The ICMP message transmitted from the none RSVP reception host 21 reaches the RSVP substitute reply router 1 via the none RSVP router 23. At this time, assuming that the RSVP substitute reply router 1 is the typical RSVP router, since the ICMP message is further transferred to the RSVP network 100, the ICMP message finally reaches the RSVP transmission host 3 to make no reservation of resource on the RSVP network 100.

To this, when the own system receives the ICMP message for the Path message transferred to the none RSVP reception host 21, the RSVP substitute reply router 1 makes judgment that the none RSVP reception host 21 is not adapted to RSVP from ICMP message and generates the Resv message of RSVP to transmit to the RSVP network 100 on behalf of the none RSVP reception host 21 by itself.

The transmitted Resv message reaches the RSVP transmission host 3 via the RSVP network 100. Since Resv message is a message for making reservation of resource on the route, it can be appreciated that reservation of resource on the route in the zone from the RSVP substitute reply router 1 to the RSVP transmission host 3 is established at a timing where Resv message reaches the RSVP transmission host 3.

The RSVP transmission host 3 may see that reservation of resource on the route can be established by receiving the Resv message. Subsequently, data packet transmitted from the RSVP transmission host 3 to the none RSVP reception host 21 can be transmitted stably without being influenced by other communication in the zone from the RSVP transmission host 3 to the RSVP substitute reply router 1.

Figure 3:
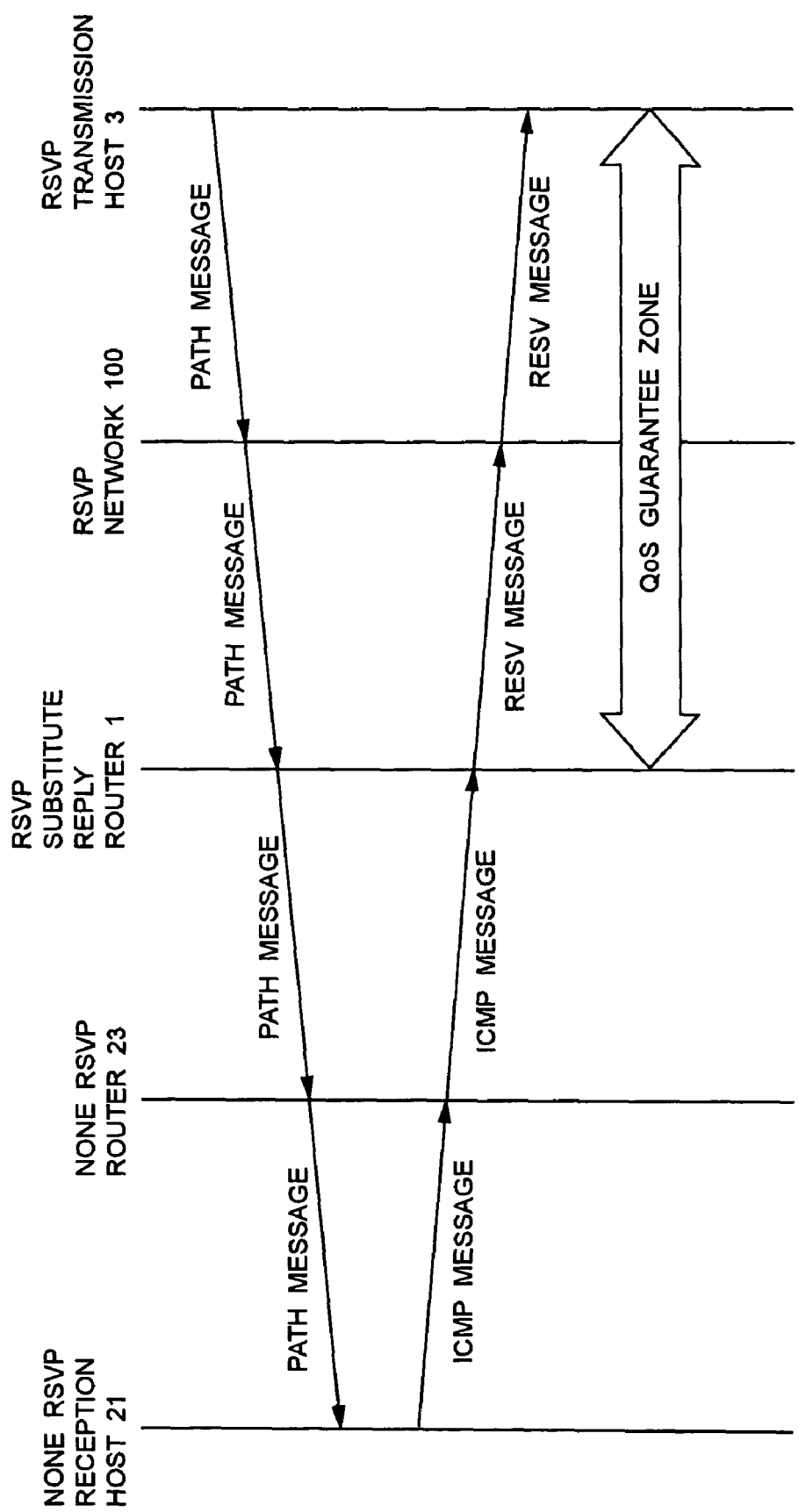
FIG. 3 is a sequence chart showing operation of the case where an RSVP transmission host transmitted a Path message of RSVP to none RSVP reception host.

FIG. 3 is a sequential chart showing operation of the case where the RSVP transmission host 3 of FIG. 1 transmits Path message of RSVP to the none RSVP reception host 21. Operation in the case where the RSVP transmission host 3 transmits the Path message of RSVP to the none RSVP reception host 21, will be discussed with reference to FIGS. 1 and 3.

The Path message transmitted from the RSVP transmission host 3 reaches the none RSVP reception host 21 via the RSVP network 100, the RSVP substitute reply router 1 and the none RSVP router 23. Subsequently, the ICMP message is transmitted from the none RSVP router 21 to reach the RSVP substitute reply router 1 via the none RSVP router 23. Here, since the RSVP substitute reply router 1 transmits the Resv message, the resource in the subsequent route can be reserved and thus finally, QoS is guaranteed over the zone from the RSVP transmission host 3 to the RSVP substitute reply router 1.

Subsequently, discussion will be given for operation of the case where the RSVP transmission host 3 transmits data packet to the RSVP reception host 3 with reference to FIG. 1. A procedure where the Path message transmitted from the RSVP transmission host 3 reaches the RSVP substitute reply router 1 becomes similar operation as standard operation of RSVP similar to the foregoing case.

When the Path message is received, the RSVP substitute reply router 1 transfers the Path message to the RSVP router 24 according to the destination. The RSVP router 24 further transfers the Path message the RSVP reception host 22 as the final recipient. Since the RSVP reception host 22 is adapted to RSVP, when the Path message is received, reservation of the resource on the route is executed by transmitting the own Resv message. The Resv message transmitted from the RSVP reception host 22 reaches the RSVP router 24.

When the Path message is received, the RSVP router 24 transfers the Resv message to the RSVP substitute reply router 1 with realizing QoS indicated in the Resv message and certainly acquiring the resource in own router. The RSVP substitute reply router 1 acquires the resource for realizing QoS indicated in Resv message similar to the RSVP router 24 to transfer the Resv message to the RSVP network 100.

Subsequent operation is the same as operation in the none RSVP reception host 21. Namely, the Resv message makes reservation of resource in the RSVP network 100 with passing through the RSVP network 100 and finally reaches to the RSVP transmission host 3. At this timing, all resource on the route from the RSVP transmission host 3 to the RSVP reception host 22 are reserved to guarantee QoS in all of zone on the route.

Figure 4:
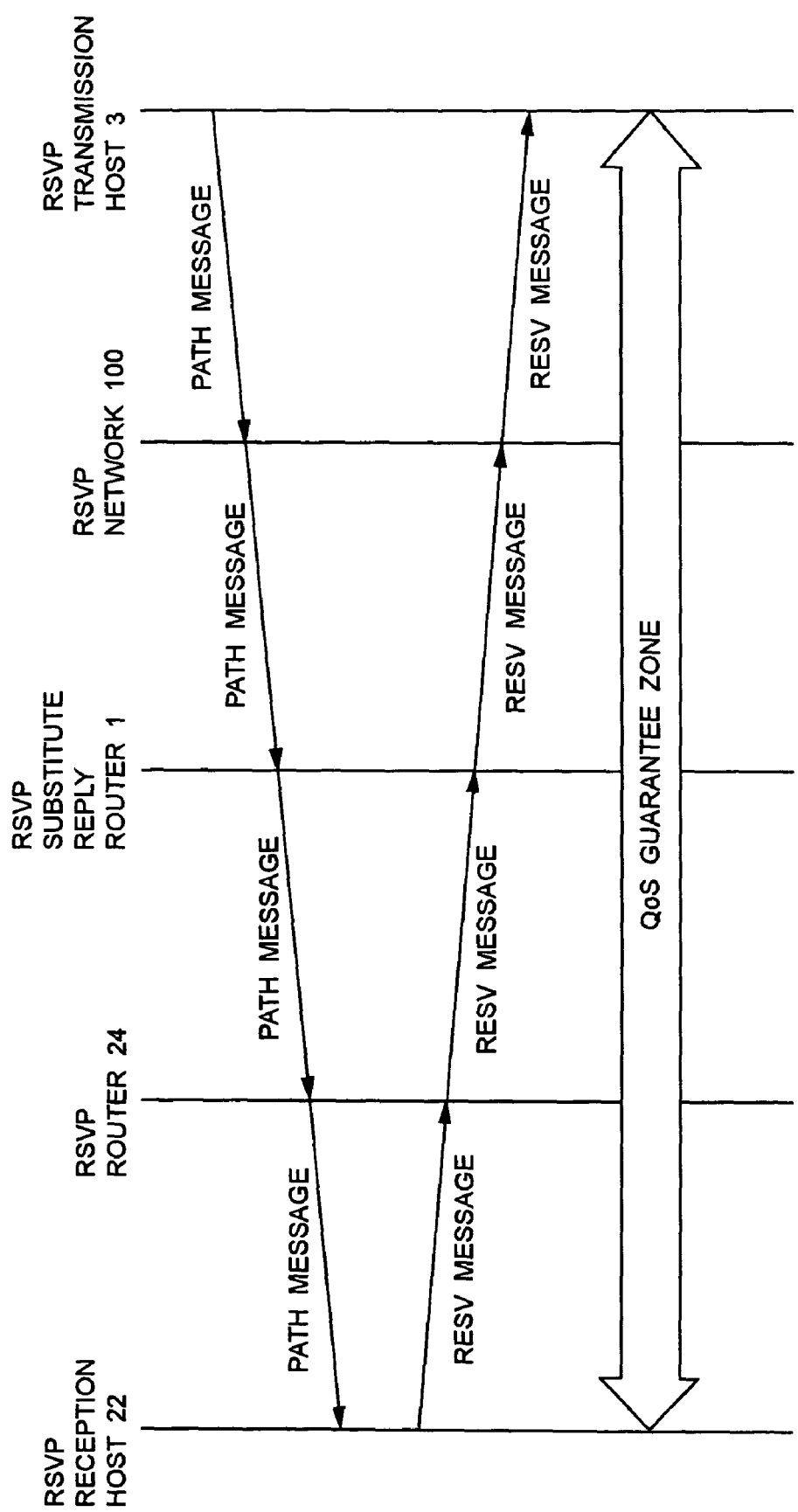
FIG. 4 is a sequence chart showing operation of the case where an RSVP transmission host transmitted a Path message of RSVP to the RSVP reception host.

FIG. 4 is a sequential chart showing operation of the case where Path message of RSVP is transmitted from the RSVP transmission host 3 of FIG. 1 to the RSVP reception host 22. Discussion will be given for operation. With reference to FIGS. 1 and 4, discussion will be given for operation of the case where the RSVP transmission host 3 transmit the Path message of RSVP to the RSVP reception host 22.

The Path message transmitted from the RSVP transmission host 3 reaches the RSVP reception host 22 via the RSVP network 100, the RSVP substitute reply router 1 and the RSVP router 24. Subsequently, the Resv message is transmitted from the RSVP router 22 to reach the RSVP transmission host 3 with making reservation of respective resource of the RSVP router 24, the RSVP substitute reply router 1 and the RSVP network 100. Accordingly, in this case, QoS is guaranteed over all of zones from the RSVP transmission host 3 to the RSVP reception host 22.

As set forth above, in the RSVP substitute reply system according to the present invention, whether the individual reception hosts are adapted to RSVP, is detected automatically by the RSVP substitute reply router 1 without expressly registering whether the individual reception hosts are adapted to RSVP in the RSVP substitute reply router 1. Only if not adapted to RSVP, substitute reply function is made active for RSVP.

FIG. 5A is an illustration showing a format of IP header, and FIG. 5B is an illustration showing a format of RSVP protocol. The formats of the IP header and RSVP protocol shown in FIGS. 5A and 5B are defined by RFC (Request For Comment) 791 and RFC2205.

FIG. 6 is an illustration showing an example of structure of the Path message transmitted from the RSVP transmission host 3 to the none RSVP reception host 21. In FIG. 6, the Identification field, the Protocol field, the sender address, the recipient address and Message Type are portion relevant to the present invention.

In the Identification field of the IP header, "12345" is set. This Identification field is the value to be used for identifying respective of divided packets when division of the packet is caused during transfer of the packet, and is set by the host transmitted the IP packet.

In the Protocol field, "46" indicating RSVP is set. In the sender address and the recipient address, addresses of the RSVP transmission host 3 and the none RSVP reception host 21 are set, respectively. On the other hand, in a Message Type of the RSVP protocol header portion, "1" indicative of the Path message is set.

FIG. 7 is an illustration showing an example of construction after recording the Path message in the Path message storage portion 17 of FIG. 2. As set forth above, there has been stored the Path message, "address of RSVP transmission host 3" as sender address of IP header, "address of none RSVP reception host 21" as recipient address and the value "12345" of Identification field.

FIG. 8 is an illustration showing format of the "message of Protocol Unreachable" of the "message of Destination Unreachable" of ICMP. In FIG. 8, in the "message of Destination Unreachable", Type (=3), Code (=2), check sum, content of the original IP header and leading eight bytes of original datagram are contained.

FIG. 9 is an illustration showing an example of structure of "message of Destination Unreachable" of ICMP transmitted from the none RSVP reception host 21 of FIG. 1. In FIG. 9, Type field, Code field, Identification field, Protocol field, sender address, recipient address and Message Type are portions relevant to the present invention.

In the Type field of ICMP, "3" indicative of "message of Destination Unreachable" and in the Code field, "2" indicative of "message of Protocol Unreachable" are set, respectively. In a portion of the original IP header portion, the IP header of the Path message is set as is. On the other hand, in the payload portion of the original, leading eight bytes of RSVP protocol is set. It should be noted that the foregoing example shows an example of IPv4. However, in IPv6, the present invention is applicable while name of message is different.

Figure 10:
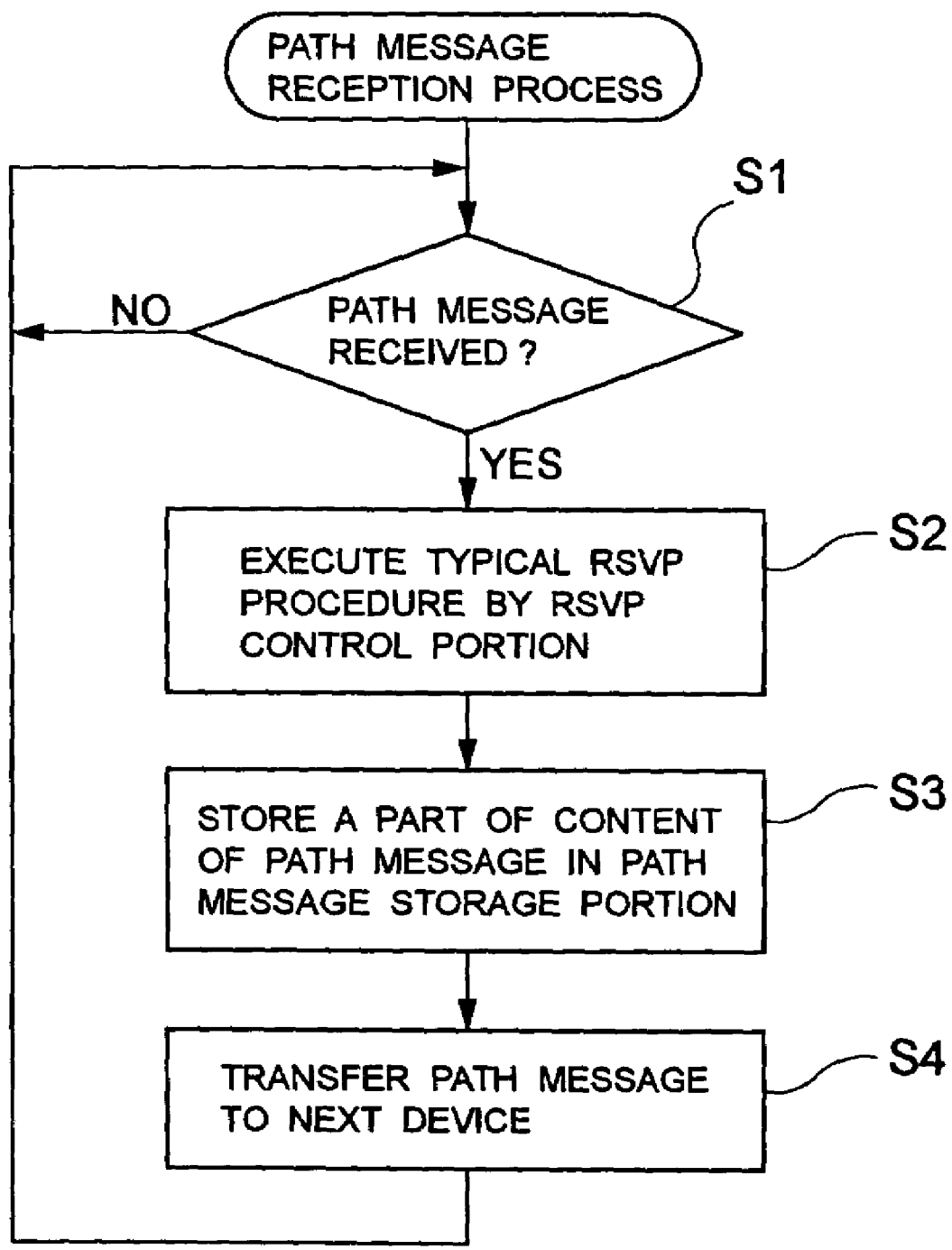
FIG. 10 is a flowchart showing a Path message reception process of the RSVP substitute reply router of FIG. 2.
Figure 11:
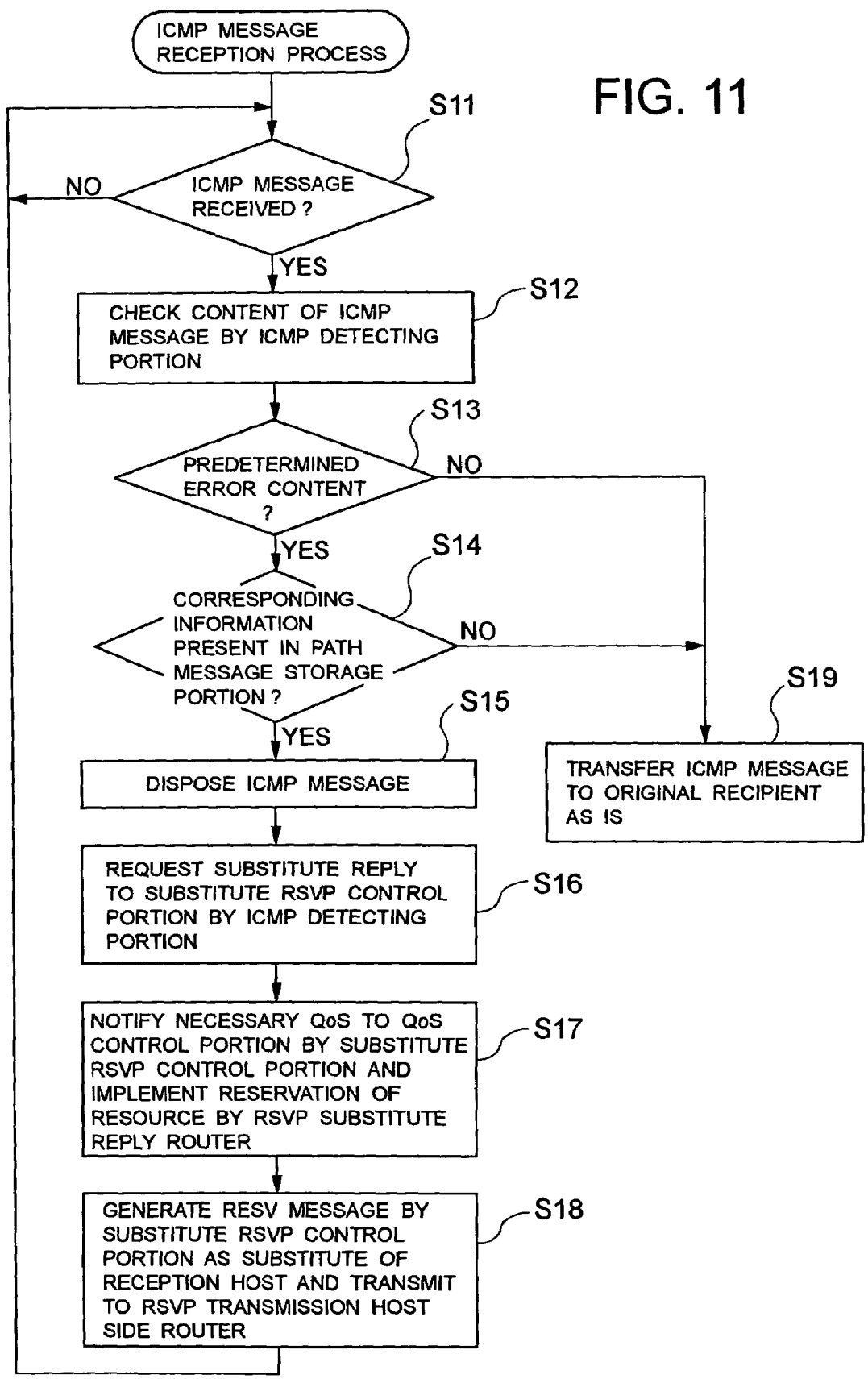
FIG. 11 is a flowchart showing an ICMP message reception process of the RSVP substitute reply router of FIG. 2.

FIG. 10 is a flowchart showing a Path message reception process of the RSVP substitute reply router 1 of FIG. 2. FIG. 11 is a flowchart showing ICMP message reception process of the RSVP substitute reply router 1 of FIG. 2. Operation of the RSVP substitute reply router 1 will be discussed with reference to FIGS. 2 and 5 to 11.

The Path message of RSVP transmitted from the transmission host 3 reaches the interface portion 11 of the RSVP substitute reply router 1 via the RSVP network 100. The Path message reaching the interface portion 11 is transferred to the routing portion 18 via the QoS control portion 13 and is further transferred to the RSVP control portion 16.

When the Path message shown in FIG. 6 is received (step S1 of FIG. 10) and after process according to the procedure of normal RSVP (step S2 of FIG. 10), the RSVP control portion 16 stores the received Path message in the Path message storage portion 17 (step S3 of FIG. 10). At this time, values of the sender address, the recipient address and Identification field of the IP header used for transfer of the Path message are stored simultaneously.

When the content of the Path message is stored in the Path message storage portion 17, the RSVP control portion 16 transfers the Path message to the routing portion 18. The routing portion 18 transfer the Path message to the interface portion 12 according to the recipient address. Thus, the Path message is fed to the RSVP/none RSVP mixed network 2 (step S4 of FIG. 10).

When the Path message reaches the none RSVP reception host 21, "message of Destination Unreachable" of ICMP is transmitted from the none RSVP reception host 21 as set forth above since the none RSVP reception host 21 is not adapted to RSVP.

The ICMP message transmitted from the none RSVP reception host 21 reaches the interface portion 12 of the RSVP substitute reply router 1 via the none RSVP router 23 (step S11 of FIG. 11). The Path message reached the interface portion 12 is transferred to the routing portion 18 via the QoS control portion 13.

When the ICMP message reaches the routing portion 18, a portion of the original IP header in the ICMP message and the value stored in the Path message storage portion 17 are compared by the ICMP detecting portion 19 (step S12 of FIG. 11). Referring to FIGS. 7 and 9, the values of the Identification field, the sender address field and the recipient address field contained in the ICMP message match with the values stored in the Path message storage portion 17. Accordingly, it can be appreciated that the ICMP message corresponds to the Path message transferred by the RSVP substitute reply router 1.

The ICMP detecting portion 19 makes judgment that the original reception host does not adapted to RSVP (steps S13 and S14 of FIG. 11) to dispose the ICMP message (step S15 of FIG. 11) and to notify the corresponding Path message information to the substitute RSVP control portion 20 to request execution of the procedure of RSVP on behalf of the original reception host (step S16 of FIG. 11).

When the Path message information is notified from the ICMP detecting portion 19, the substitute RSVP control portion 20 executes the procedure of RSVP on behalf of the original reception host. At this time, the substitute RSVP 20 notifies communication to be object for QoS and QoS applicable for communication to the QoS control portion 13 in order to certainly acquire resource in the RSVP substitute reply router 1. In the QoS control portion 13, upon receipt of the notification of the communication to be object of QoS and the notification of the applicable QoS for the communication from the substitute RSVP control portion 20, setting of the classifier 14 is modified so that communication can be classified into appropriate QoS class and setting of the packet scheduler 15 is modified for applying appropriate QoS for QoS class (step S17 of FIG. 11).

By this, data packet transmitted from the transmission host 3 to the reception host 21 is classified into appropriate QoS class by the classifier 14 upon passing through the QoS control portion 13 and is transmitted by the packet scheduler with guarantee of QoS.

The substitute RSVP control portion 20 executed the procedure of RSVP transfers the same message to the routing portion 18 in order to transmit the Resv message to the next hop router up to the RSVP transmission host 3. According to the recipient, the routing portion 18 transfers the interface portion 11 of the Resv message. The Resv message is transmitted from the interface portion 11 on the RSVP network 100 to make reservation of resource on the route up to the RSVP transmission host 3 (step S18 of FIG. 11).

Accordingly, the RSVP substitute reply router 1 can detect that the reception host is not adapted to RSVP by "message of Destination Unreachable" of received ICMP and automatically execute RSVP substitute reply process.

On the other hand, when matched one is not found in the foregoing comparison (steps S13 and S14 of FIG. 11), the ICMP detecting portion 19 makes judgment as not being relevant to return the ICMP message to the routing portion 18 to permit the routing portion 18 to process the ICMP message. The routing portion 18 transfers the ICMP message to the interface portion 11 according to the recipient address, and then the ICMP message is transmitted to the RSVP network 100 to be transferred to the original recipient (step S19 of FIG. 11).

It should be noted that while the RSVP/none RSVP mixed network 2 shown in FIG. 1 is constructed with respective one none RSVP reception host 21, the none RSVP router 23, the RSVP reception host 22 and the RSVP router 24, the network can be constructed with respectively plurality of components.

On the other hand, in the RSVP substitute reply router 1 shown in FIG. 2, the interface portion 11 is arranged corresponding to the transmission host side and the interface portion 12 is arranged corresponding to the reception side host respectively for facilitating disclosure. However, it is also possible that the interfaces 11 and 12 simultaneously handle reception host and the transmission host. Furthermore, in the RSVP substitute reply router 1, number of interfaces can be greater than two.

As set forth above, in the shown embodiment, by detecting "message of Destination Unreachable" of ICMP transmitted from the reception host by the RSVP substitute reply router, it becomes possible to automatically detect whether the reception host is adapted to RSVP or not. Accordingly, in the shown embodiment, when large number of the none RSVP reception hosts 21 not adapted to RSVP and the RSVP reception hosts 22 corresponding to RSVP are present in the data reception side network in admixing manner, only for the none RSVP reception host 21 not corresponding to RSVP, the procedure of RSVP can be executed as substitute even when addresses of individual reception hosts are not registered in the RSVP substitute reply router 1 per se.

Figure 12:
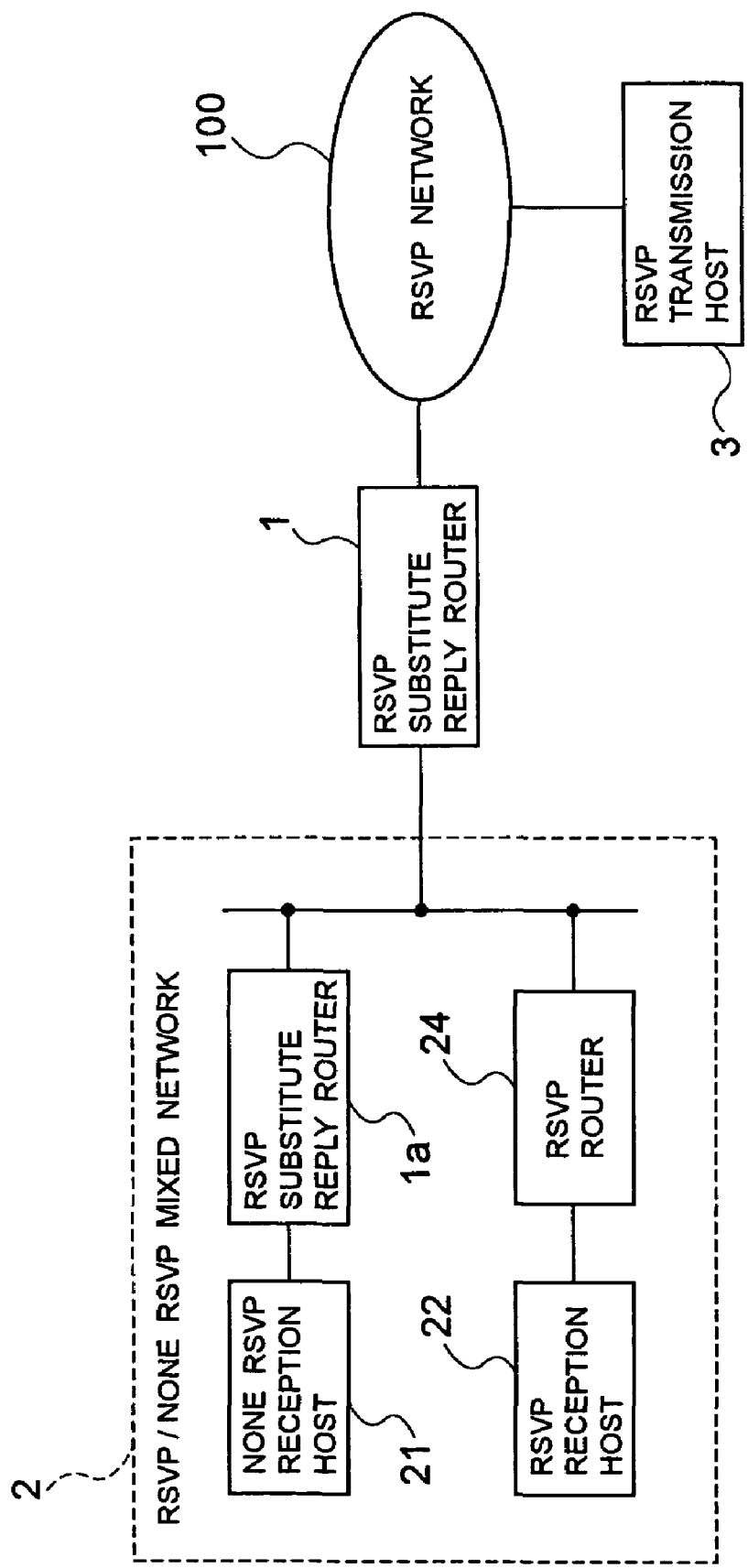
FIG. 12 is a block diagram showing a construction of another embodiment of a RSVP substitute reply system according to the present invention.

FIG. 12 is a block diagram showing a construction of another embodiment of a RSVP substitute reply system according to the present invention. In FIG. 12, another embodiment of the RSVP substitute reply system according to the present invention has similar construction to one embodiment of the RSVP substitute reply system according to the present invention shown in FIG. 1 except for replacing the none RSVP router 23 with a RSVP substitute reply router 1a. The like components to those in the former embodiment will be identified by like reference numerals and detailed description for these common or similar components for the former embodiment will be eliminated in order to avoid redundant disclosure and whereby to maintain the disclosure simple enough to facilitate clear understanding of the invention.

Figure 13:
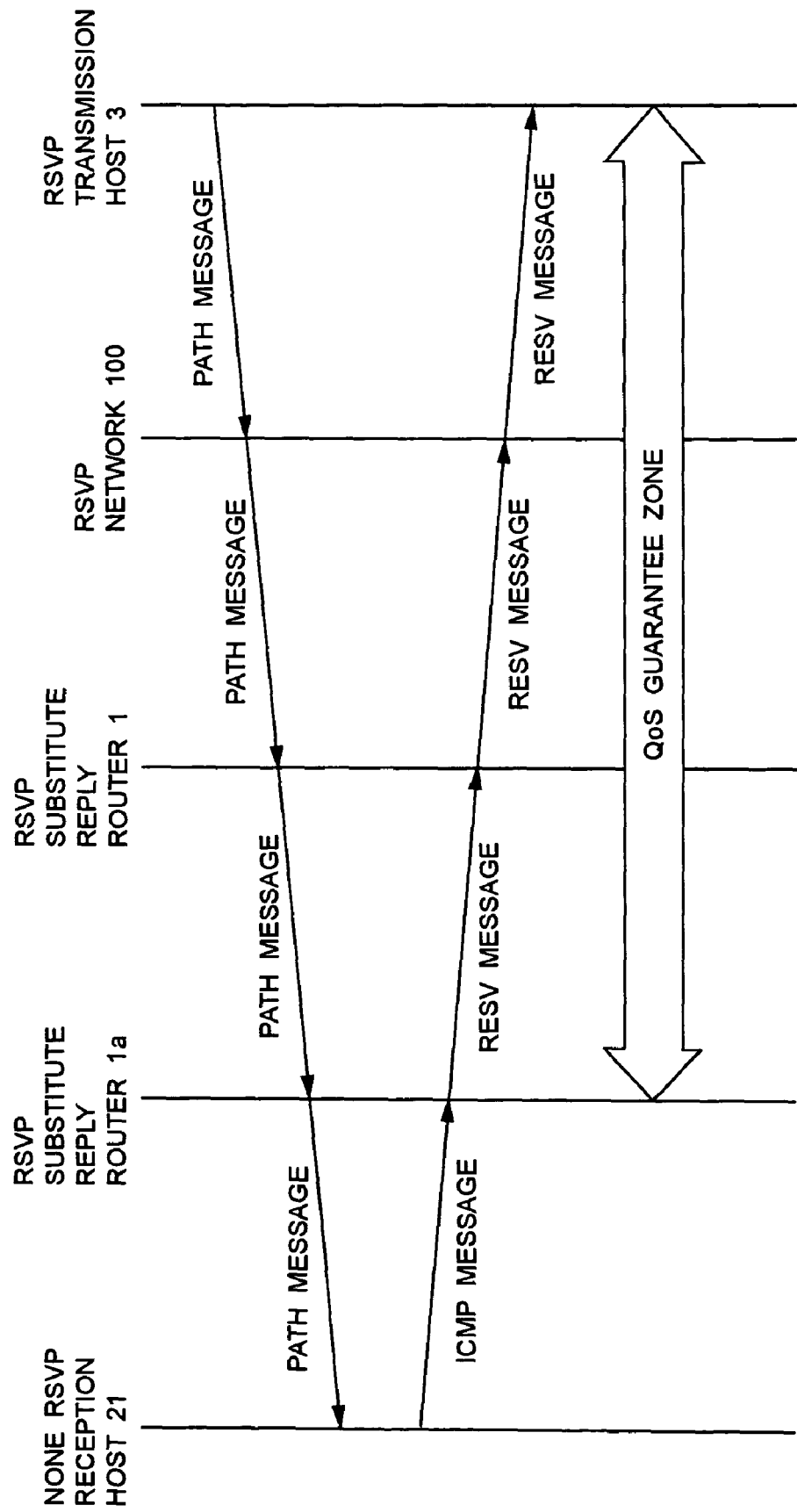
FIG. 13 is a sequence chart showing operation in the case when the RSVP transmission host transmits the Path message to the none RSVP reception host.

FIG. 13 is a sequential chart showing operation of the case where the RSVP transmission host 3 of FIG. 12 transmits the Path message for the none RSVP reception host 21. With reference to FIGS. 12 and 13, discussion will be given for operation in the case where the RSVP transmission host 3 transmits the Path message to the none RSVP reception host 21.

The Path message transmitted from the RSVP transmission host 3 reaches the none RSVP reception host 21 via the RSVP network 100, the RSVP substitute reply router 1 and the RSVP substitute reply router 1a. Since the none RSVP reception host 21 is not adapted to RSVP, it transmits the "message of Destination Unreachable" of ICMP to the RSVP transmission host 3.

The RSVP substitute reply router 1a receiving the ICMP message executes procedure of RSVP on behalf of none RSVP reception host 21 to transmit the Resv message. The RSVP substitute reply router 1 receiving the Resv message operates as typical RSVP router to transmit the Resv message to the RSVP network 100. The Resv message reaches the RSVP transmission host 3 to finally guarantee QoS in the zone from the transmission host 3 to the RSVP substitute reply router 1a.

In the shown embodiment, as shown in FIG. 13, for the Path message from the RSVP transmission host 3, substitute reply is implemented by the RSVP substitute reply router 1a close to the none RSVP reception host 21. As a result, it becomes possible to guarantee QoS in the zone of wide range.

As set forth above, in the shown embodiment, by connecting RSVP substitute reply routers 1 multiple stage, substitute reply at close position to the final reception host becomes possible to guarantee QoS in the zone of wide range.

Figure 14:
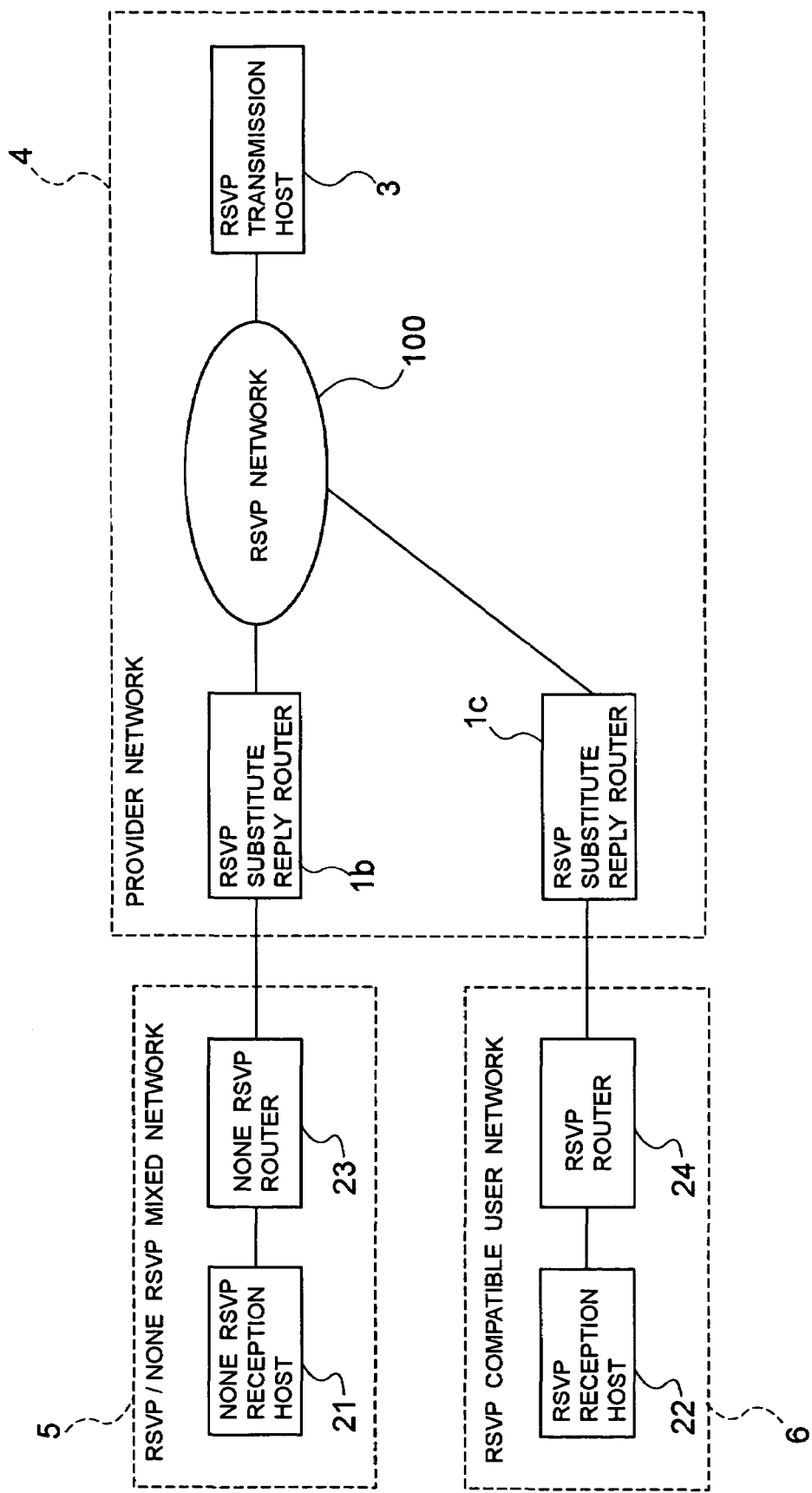
FIG. 14 is a block diagram showing a construction of a further embodiment of RSVP substitute reply system according to the present invention.
Figure 15:
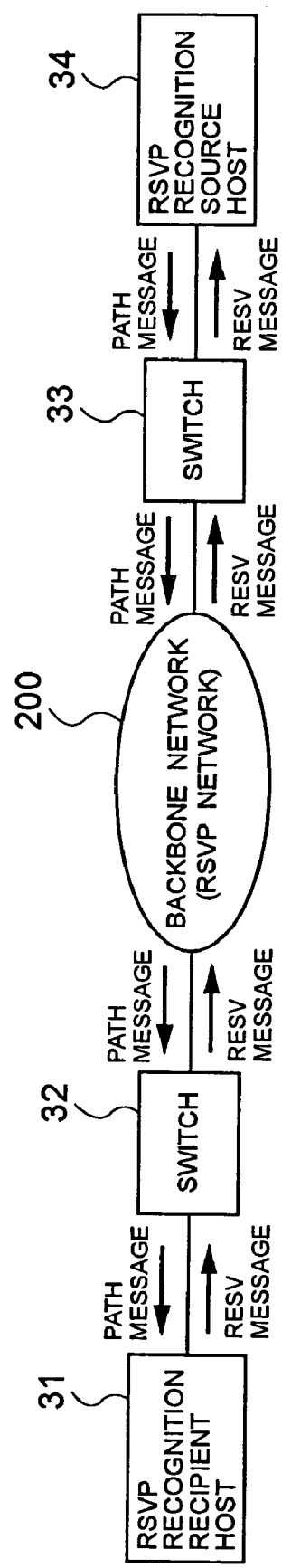
FIG. 15 is an illustration showing a procedure of the conventional RSVP.
Figure 16:
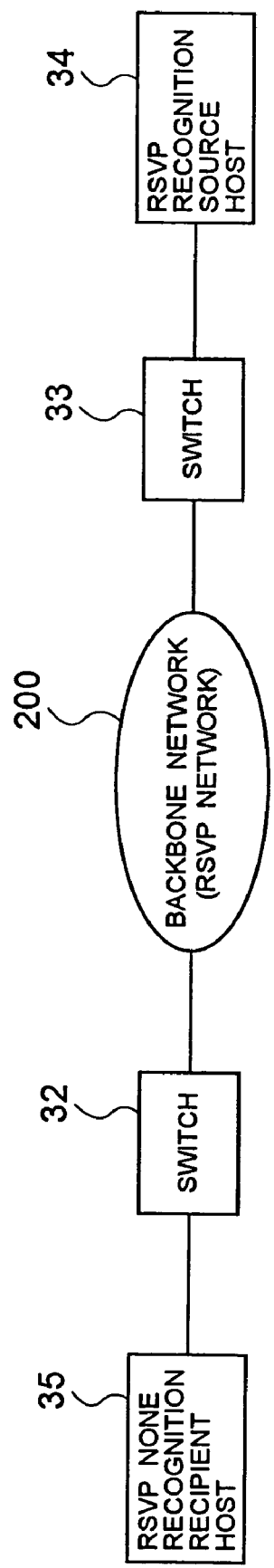
FIG. 16 is a block diagram showing a system construction of the conventional RSVP proxy service.

FIG. 14 is a block diagram showing a further embodiment of a RSVP substitute reply system according to the present invention. In FIG. 14, a further embodiment of the RSVP substitute reply system is constructed with connecting the provider network 4 with the RSVP incompatible user network 5 and the RSVP compatible user network 6. It should be noted that, in FIG. 14, respective one the RSVP compatible user network 6 and the RSVP incompatible user network 5 are connected to a provider network 4. However, in similar mode of implementation, respectively plurality of the RSVP compatible user networks 6 and the RSVP incompatible user networks 5 may be connected to a provider network 4.

The RSVP incompatible user network 5 is a network constructed with none RSVP reception host 21, none RSVP router 23 and so forth not adapted to RSVP and cannot execute procedure of RSVP.

On the other hand, the RSVP compatible user network 6 is a network constructed with RSVP reception host 22, RSVP router 24 and so forth and can execute procedure of RSVP.

The provider network 4 is constructed with the RSVP network 100, the RSVP transmission host 3, a RSVP substitute reply routers 1b and 1c. The RSVP substitute reply router 1b is connected to the RSVP incompatible user network 5 and the RSVP network 100. The RSVP substitute reply router 1c is connected to the RSVP compatible user network 6 and the RSVP network 100. On the other hand, the RSVP transmission host 3 is a content server or the like broadcasting motion picture, voice or the like, and is connected to the RSVP network 100.

Referring to FIG. 14, discussion will be given for operation of the case where the RSVP transmission host 3 transmits data packet to the RSVP incompatible user network 5 and the RSVP compatible user network 6.

When the RSVP transmission host 3 transmits data packet to the RSVP incompatible user network 5, the RSVP transmission host 3 transmits the Path message to the none RSVP reception host 21 presenting in the RSVP incompatible user network 5. The Path message is delivered to the none RSVP reception network in the RSVP incompatible user network 5 via the RSVP network 100 and the RSVP substitute reply router 1b.

Since the RSVP incompatible user network 5 is constructed with equipments not adapted to RSVP, the none RSVP reception host 21 is not also adapted to RSVP. Therefore, "message of Destination Unreachable" of ICMP is transmitted from the RSVP reception host 21 to the RSVP transmission host 3.

By reaching the ICMP message to the RSVP substitute reply router 1b, the RSVP substitute reply router 1b detects that the reception host is not adapted to RSVP to transmit the Resv message by implementing process of RSVP on behalf of the reception host. At a timing where the Resv message reaches the RSVP transmission host 3 via the RSVP network 100, QoS is guaranteed in the route from the RSVP transmission host 3 to the RSVP substitute reply router 1b.

When the RSVP transmission host 3 transmits data packet to the RSVP compatible user network 6, the RSVP transmission host 3 transmits the Path message toward the RSVP reception host 22 presenting in the RSVP compatible user network 6. The Path message is delivered to the RSVP reception host 22 in the RSVP compatible user network 6 through the RSVP network 100 and the RSVP substitute reply router 1c.

The RSVP compatible user network 6 is constructed with equipments adapted to RSVP. Therefore, the RSVP reception host 22 receiving the Path message makes reservation of resource on the route transmitting the Resv message by itself. When the Resv message reaches the RSVP substitute reply router 1c, the RSVP substitute reply router 1c handles the Resv message similar to the typical RSVP router to transmit the Resv message to the next hop router of the RSVP network 100. At a timing where the Resv message reaches the RSVP transmission host 3 via the RSVP network 100, QoS is guaranteed in the route from the RSVP transmission host 3 to the RSVP reception host 22.

Accordingly, when the user network is not adapted to RSVP, the provider network 4 at least guarantee QoS in the provider network. When the user network is adapted to RSVP, QoS can be guaranteed up to the RSVP reception host 22. On the other hand, when the RSVP incompatible user network 5 not adapted top RSVP becomes compatible with RSVP, range of guarantee of QoS can be automatically expanded to the reception host without modifying environment or setting of the provider network.

As set forth above, in the shown embodiment, QoS can be guaranteed in an appropriate range adapted to the user network environment without modifying setting in the provider network 4.

As set forth above, the system and method according to the present invention, in the RSVP substitute reply system transferring a verification message transmitted from the transmission host for obtaining guarantee of service quality in the transmission route to the reception host by the RSVP substitute reply router arranged between the transmission host and the reception host upon transmitting data packet from the transmission host to the reception host, the RSVP substitute reply router monitors the response message from the reception host to the verification message, executes RSVP procedure on behalf of the reception host when judgment is made that the reception host is the equipment not adapted to RSVP on the basis of the response message, to make reservation of resource on the route to the transmission host so that incompatibility of the reception host to RSVP is detected automatically to execute RSVP procedure as substitute.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A resource reservation protocol substitute reply router transferring a verification message transmitted from a transmission host to a reception host for acquiring guarantee of service quality of a transmission route upon transmitting data packet from said transmission host to said reception host, comprising:

judgment means for monitoring a response message from said reception host for said verification message and making a judgment whether said reception host is an equipment supporting said resource reservation protocol or not; and substitute resource reservation protocol control means for executing a procedure of resource reservation protocol on behalf of said reception host which is judged as not supporting resource reservation protocol; and reservation means for making reservation of resource on the route to said transmission host, wherein said judgment means monitors an internet control message protocol message, and makes judgment whether said reception host is an equipment supporting said resource reservation protocol or not from said internet control message protocol message;

wherein said internet control message protocol message is the response message from said reception host for a Path message of resource reservation protocol that is transmitted as the verification message and transmitted to a sender of a data packet upon receipt of a packet of a not supported protocol.

2. The resource reservation protocol substitute reply router as set forth in claim 1, wherein said substitute resource reservation protocol control means generates a reserve message indicative of service quality in said transmission route for said Path message on behalf of said reception host, and transmits said reserve message to said transmission host.

3. The resource reservation protocol substitute reply router as set forth in claim 1, which is in a network in which a plurality of the reception hosts not supporting said resource reservation protocol and the reception hosts supporting said resource reservation protocol are present in admixing manner.

4. The resource reservation protocol substitute reply router as set forth in claim 1, which is in a network in which a plurality of the reception hosts not supporting said resource reservation protocol and the reception hosts supporting said resource reservation protocol are present in admixing manner.

5. The resource reservation protocol substitute reply router as set forth in claim 1, which is respectively in a network consisted of the reception host not supporting said resource reservation protocol and a network consisted of the reception host supporting said resource reservation protocol.

6. A resource reservation protocol substitute reply system transferring a verification message transmitted from a transmission host to a reception host for acquiring guarantee of service quality of a transmission route upon transmitting data packet from said transmission host to said reception host by a resource reservation protocol substitute reply router arranged between said transmission host and said reception host, wherein said resource reservation protocol substitute reply router comprises:

judgment means for monitoring a response message from said reception host for said verification message and making judgment whether said reception host is an equipment supporting said resource reservation protocol or not; and substitute resource reservation protocol control means for executing a procedure of resource reservation protocol on behalf of said reception host which is judged as not supporting resource reservation protocol; and reservation means for making reservation of resource on the route to said transmission host, wherein said judgment means monitors an internet control message protocol message, and makes judgment whether said reception host is an equipment supporting said resource reservation protocol or not from said internet control message protocol message;

wherein said internet control message protocol message is the response message from said reception host for a Path message of resource reservation protocol that is transmitted as the verification message and transmitted to a sender of a data packet upon receipt of a packet of a not supported protocol.

7. The resource reservation protocol substitute reply system as set forth in claim 6, wherein said substitute resource reservation protocol control means generates a reserve message indicative of service quality in said transmission route for said Path message on behalf of said reception host, and transmits said reserve message to said transmission host.

8. The resource reservation protocol substitute reply system as set forth in claim 6, wherein said resource reservation protocol substitute reply router is in a network in which a plurality of the reception hosts not supporting said resource reservation protocol and the reception hosts supporting said resource reservation protocol are present in admixing manner.

9. The resource reservation protocol substitute reply system as set forth in claim 6, wherein said resource reservation protocol substitute reply router is in a network in which a plurality of the reception hosts not supporting said resource reservation protocol and the reception hosts supporting said resource reservation protocol are present in admixing manner.

10. The resource reservation protocol substitute reply system as set forth in claim 6, wherein said resource reservation protocol substitute reply router is respectively in a network consisted of the reception host not supporting said resource reservation protocol and a network consisted of the reception host supporting said resource reservation protocol.

11. A resource reservation protocol substitute reply method comprising the steps of:

transferring a verification message transmitted from a transmission host to the reception host;

acquiring guarantee of service quality of a transmission route upon transmitting data packet from said transmission host to a reception host by a resource reservation protocol substitute reply router arranged between said transmission host and said reception host, monitoring, by said resource reservation protocol substitute reply router, a response message from said reception host for said verification message;

executing a procedure of resource reservation protocol on behalf of said reception host which is judged as not supporting resource reservation protocol; and making reservation of resource on the route to said transmission host, wherein said resource reservation protocol substitute reply router monitors an internet control message protocol message, and makes judgment whether said reception host is an equipment supporting said resource reservation protocol or not from said internet control message protocol message;

wherein said internet control message protocol message is the response message from said reception host for a Path message of resource reservation protocol that is transmitted as the verification message and transmitted to a sender of a data packet upon receipt of a packet of a not supported protocol.

12. The resource reservation protocol substitute reply method as set forth in claim 11, wherein said resource reservation protocol substitute reply router generates a reserve message indicative of service quality in said transmission route for said Path message on behalf of said reception host, and transmits said reserve message to said transmission host.

13. The resource reservation protocol substitute reply method as set forth in claim 11, wherein said resource reservation protocol substitute reply router is in a network in which a plurality of the reception hosts not supporting said resource reservation protocol and the reception hosts supporting said resource reservation protocol are present in admixing manner.

14. The resource reservation protocol substitute reply method as set forth in claim 11, wherein said resource reservation protocol substitute reply router is in a network in which a plurality of the reception hosts not supporting said resource reservation protocol and the reception hosts supporting said resource reservation protocol are present in admixing manner.

15. The resource reservation protocol substitute reply method as set forth in claim 11, wherein said resource reservation protocol substitute reply router is respectively in a network consisted of the reception host not supporting said resource reservation protocol and a network consisted of the reception host supporting said resource reservation protocol.

* * * * *